June 20, 1944.  O. ENGLER  2,351,944
MAGNETIC TESTING METHOD
Filed Dec. 9, 1940
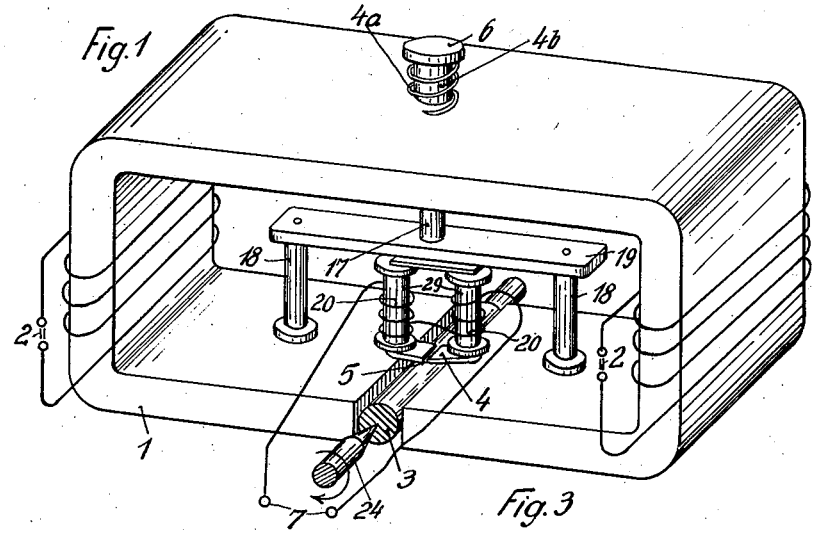
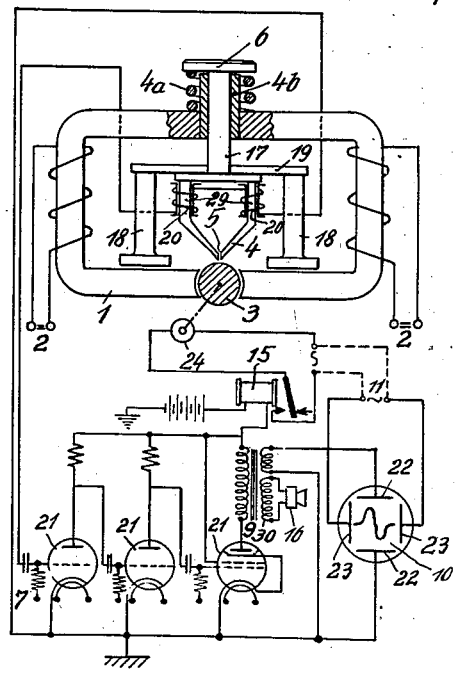
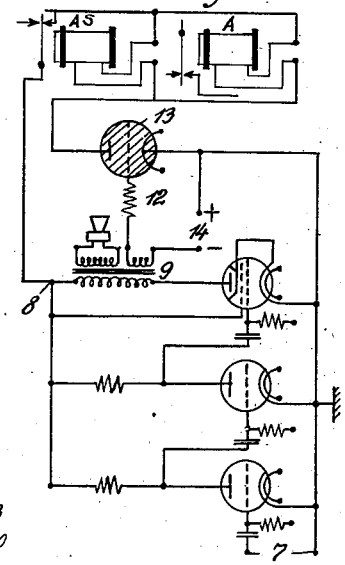
Inventor:
Otto Engler,
by John B. Brady.
Attorney Patented June 20, 1944

2,351,944

UNITED STATES PATENT OFFICE 2,351,944

MAGNETIC TESTING METHOD

Otto Engler, Lubeck, Germany; vested in the Alien Property Custodian

Application December 9, 1940, Serial No. 369,334
In Germany December 13, 1939

1 Claim. (Cl. 175—183)

This invention relates to a magnetic method and apparatus for finding out discontinuities in the structure of test bodies and has particular reference to a method and apparatus for detecting cracks in cylindrical steel bodies and similar circular magnetizable test pieces.

It is an important object of the present invention to provide means for detecting cracks in magnetizable, round bodies independently of variations of the magnetic permeability of the body which are not caused by cracks or other mechanical discontinuities in the structure of the test bodies.

With this and further objects in view, as may become apparent from the within disclosures, the invention consists not only in the structures herein pointed out and illustrated by the drawing, but includes further structures coming within the scope of what hereinafter may be claimed.

The character of the invention, however, may be best understood by reference to certain of its structural forms, as illustrated by the accompanying drawing in which—

Fig. 1 is a perspective view of an arrangement for carrying out the invention.

Fig. 2a is a diagrammatic view, partly in section, of the same arrangement, including a circuit diagram of an amplifier for connection to the apparatus of Fig. 1.

Fig. 2b is a modified circuit diagram.

Fig. 3 is a diagrammatic fragmentary plan view, illustrating an arrangement for examining the whole length of test rods.

Similar characters of reference denote similar parts in the different views.

As here shown, I provide a small magnet having a narrow air gap arranged in close vicinity to a cylindrical test body of steel or the like which is transversely magnetized by a strong D. C. field and rotated about its axis. In this manner it is possible to confine the magnetic interaction between the narrow air gap and the test body to the actual width of the crack to be investigated, independently of permeability variations extending throughout the cross section of the test body. Owing to the narrow air gap, amounting to a few hundredths of a millimeter only, the "stray field" caused by the crack is sharply defined, so that even with microscopically small cracks a very sharp indication is obtained. On the other hand, variations of the permeability of the material are not indicated, since such variations, caused, e. g., by structural mechanical stresses or strains, are continuous and in view of the low speed of the test body of about 5 to 10 revolutions per second have no noticeable effects upon the measurement, the scanning of the cracks being effected with a frequency exceeding this frequency by one or more decimal orders.

It will thus be understood that according to the invention the "stray field" of the test body is investigated by means of a magnet system having an air gap, the test body being moved relatively to the magnet system including the air gap.

According to the preferred form of the invention the cross-magnetized test body is rotated with respect to the stationary slit magnet system. It is also possible, however, if desired, to rotate the slit magnet system with respect to a stationary test body.

Referring now to the drawing in greater detail, and first to Fig. 1, a cylindrical test body 3 is rotated at a speed of 5 to 10 revolutions per second between the pole shoes of an electromagnet I which is magnetized by D. C. coils 2. A second magnet system 4 is suspended from a rod 17 which is slidably mounted in a sleeve 4b fixedly secured in a bore of magnet frame I. Additional pole shoes 18 depending from a transverse bar 19 serve to lower the magnetic system 4 from its position of rest as indicated, into its operative position, by magnetic attraction of said pole shoes 18, against a helical spring 4a bearing against an upper flange 6 on rod 17. The gap 5 has a width of less than .05 mm., i. e., a few hundredths of one millimeter only, and in its lower operative position is spaced from the test body 3 by a certain distance which is determined by engagement of flange 6 with the upper end face of sleeve 4b.

Any variations of the magnetic flux induced in magnet 4 by the adjacent rotating test body thus will induce a current in its induction coils 20 which is supplied to an amplifier 7, Fig. 2a. Through any suitable arrangement of thermionic tubes 21, connected in cascade as shown, and a transformer 9, the impulse is amplified and applied to a pair of vertical deflecting or measuring plates 22 of a cathode ray tube 10, the time plates 23 of which are connected to a source of alternating current 11 having a frequency corresponding to the revolution number of the test body 3. In order to ensure exact synchronism between the horizontal deflection of the cathode ray by the time plates 23 and the revolution number of the test body 3, the latter may be driven by a synchronous motor, indicated schematically at 24, which is supplied with alternating current from the source of current 11 or from a common main source of current, as indicated in Fig. 2a in dotted lines. The amplifier advantageously is a mains-operated amplifier of low noise level, for instance, a measuring amplifier.

It will thus be understood that the cathode ray oscillograph 10 on its fluorescent screen normally will display a straight horizontal line, produced by the temporal deflection of the cathode ray, provided that the test body 3 is not rotated or has no cracks or other discontinuities in its structure. On the other hand, in case of any cracks or the like existing in the test body, the alternating current induced by such cracks in the coils 20 and amplified through the tubes 21, is rendered visible on the screen of tube 10 in the form of a stationary or nearly stationary image, as indicated in Fig. 2a.

It will be noted that the output transformer 9, Fig. 2a, comprises an additional winding 30 for connection of an acoustic and/or optical indicator, such as a loudspeaker 16 producing a sound in case of any cracks in the test body 3. In addition, a relay 15 may be connected, for effecting any desired switching operations, e. g., for assorting any test bodies 3 showing cracks. Moreover, where the output tube of the amplifier 7 is indirectly heated, the relay 15 may be used to switch in the driving motor 24 for the test body 3, as indicated in Fig. 2a, thus rendering the testing device operative only when the amplifier 7 is operating.

Fig. 2b exemplifies a circuit for controlling an automatic assorting device (not shown). The amplified impulse in this case is impressed upon the grid of a control value 13 permitting substantially unhampered passage of current from its cathode to the anode as a predetermined grid voltage is reached, while forming an absolute bar in case of a lower grid voltage (suitable valves being, e. g., gas discharge valves or valves known under the registered trade-mark "Thyratron"). The ignition voltage of valve 13 may be adjusted by variation of a D. C. voltage inserted at 14, in conformity with the minimum size of cracks which is to be indicated. The valve 13 serves for actuation of a relay system A, AS with delayed action (delayed attraction or delayed release by which an assorting device (not shown) is automatically controlled.

Various modifications may be made without departing from the scope of the invention. For instance, the coils 2 may be energized by A. C. of suitable frequency, if desired. Further, the magnetic field of magnet 1 may be used to hold the test body 3 in axial and/or radial direction.

Where the whole length of longer rods is to be tested, it may be desirable to provide three or more magnet systems 4, 4', 4" with air gaps 5, 5', 5", etc., as indicated in Fig. 3, representing a section through the cores 29 of magnet 4. The several magnet systems 4, 4', 4" may be connected to separate amplifiers and indicators, or to a common amplifier and indicator system. To this end, the induction coils of the various magnet systems 4, 4', 4", may be connected in series.

The method and apparatus of the present invention have been described in detail with reference to specific embodiments. It is to be understood, however, that the invention is not limited by such specific reference but is broader in scope and capable of other embodiments than those specifically described and illustrated in the drawing.

I claim:

An arrangement for examining substantially circular magnetizable bodies, comprising in combination with a test body of magnetic material possessing stray fields about the surface thereof, a substantially closed magnetic core circuit, including an air gap disposed in the stray field of the test body, means including an electric motor for causing rotation of the test body relatively to the air gap about the center axis of the test body, means including an amplifier with indirectly heated output valve for indicating magnetic impulses induced in said magnetic core circuit as a result of structural discontinuities in the relatively rotating test body, and means including a relay inserted in the anode circuit of said output valve and adapted to connect said electric motor to its source of current when energized by anode current.

OTTO ENGLER.